US 8,220,675 B2

(12) United States Patent
Rohard

(10) Patent No.: US 8,220,675 B2
(45) Date of Patent: Jul. 17, 2012

(54) DEVICE FOR CHANGING GLOVE FOR MANIPULATION IN A CONFINED ATMOSPHERE, AND METHOD FOR CHANGING A GLOVE

(75) Inventor: Michel Rohard, Houssay (FR)

(73) Assignee: Getinge la Calhene, Vendome (FR)

( * ) Notice: Subject to any disclaimer, the term of this patent is extended or adjusted under 35 U.S.C. 154(b) by 1170 days.

(21) Appl. No.: 12/042,175

(22) Filed: Mar. 4, 2008

(65) Prior Publication Data

US 2008/0217366 A1    Sep. 11, 2008

(30) Foreign Application Priority Data

Mar. 5, 2007  (FR) .................................... 07 53644

(51) Int. Cl.
A47G 25/80  (2006.01)

(52) U.S. Cl. ....................................................... 223/111

(58) Field of Classification Search ................ 2/16, 159, 2/160, 161.6, 162, 166; 223/111; 976/DIG. 339, 976/363
See application file for complete search history.

(56) References Cited

U.S. PATENT DOCUMENTS

| | | | | |
|---|---|---|---|---|
| 1,010,558 | A | * | 12/1911 | Williamson ........................ 2/16 |
| 3,103,016 | A | * | 9/1963 | Perlman ............................ 2/270 |
| 3,475,808 | A | * | 11/1969 | Woolsey .................... 29/402.08 |
| 3,811,132 | A | * | 5/1974 | Segonzac et al. ................. 2/270 |
| 4,141,609 | A |  | 2/1979 | Eisert |
| 4,156,146 | A | * | 5/1979 | Imai et al. .................. 250/516.1 |
| 5,299,243 | A |  | 3/1994 | Picco |
| 6,715,159 | B2 | * | 4/2004 | Cormier ............................ 2/457 |
| 2002/0189007 | A1 |  | 12/2002 | Cormier |
| 2005/0278838 | A1 | * | 12/2005 | Shenosky et al. ................ 2/457 |

FOREIGN PATENT DOCUMENTS

| | | |
|---|---|---|
| DE | 1 259 659 | 1/1968 |
| DE | 24 49 104 A1 | 4/1975 |
| DE | 199 26 995 A1 | 12/2000 |
| DE | 199 38 667 A1 | 2/2001 |
| EP | 0 022 290 A1 | 1/1981 |
| EP | 0 030 565 A1 | 6/1981 |
| EP | 0 418 160 A1 | 3/1991 |
| EP | 0 549 450 A1 | 6/1993 |
| FR | 2 449 516 | 9/1980 |
| FR | 2 685 244 A1 | 6/1993 |
| FR | 2 856 328 A1 | 12/2004 |
| GB | 2 243 103 A | 10/1991 |
| WO | WO 98/24599 | 6/1998 |

* cited by examiner

*Primary Examiner* — Shaun R Hurley
*Assistant Examiner* — Andrew Sutton
(74) *Attorney, Agent, or Firm* — Oblon, Spivak, McClelland, Maier & Neustadt, L.L.P.

(57) ABSTRACT

Device to change a glove used for manipulation in confined spaces, including a part to receive the hand in a flexible material, and a ring, on a longitudinal axis, around an opening in the glove for insertion of the hand, with said ring also having means for attachment to an enclosure forming a confined space, said attachment means being designed to be locked and unlocked by application of a substantially axial force, the device including a push device that is intended to be placed on the used glove, and a support that is intended to receive the new glove.

18 Claims, 11 Drawing Sheets

DEVICE FOR CHANGING GLOVE FOR MANIPULATION IN A CONFINED ATMOSPHERE, AND METHOD FOR CHANGING A GLOVE

TECHNICAL FIELD AND PRIOR ART

This present invention relates mainly to a device to change gloves for manipulation in confined atmospheres, particularly in the nuclear and chemical fields, and to a method to change a glove using such a device.

The manipulation of toxic products, such as radioactive elements or very volatile chemical products is currently effected in confined atmospheres. Confined atmospheres are also used to provide protection from external polluting elements, when one is seeking to manipulate in a sterile atmosphere, such as in the case of the pharmaceutical or food industries for example.

These confined atmospheres include a substantially sealed enclosure. In order to be able to effect manipulations from the outside of the enclosure, the latter includes openings to which gloves are attached. Thus, a person inserting a hand into a glove is able to manipulate the objects contained in the enclosure without the risk of polluting them and without a risk of being contaminated.

These gloves are fixed onto the enclosure by clamping onto a ring attached to the enclosure. In fact since the gloves are made of flexible and elastic material, it is possible to deform them at least slightly so that they accommodate the ring. Retention of the glove on the ring is achieved by an o-ring.

The problem of changing the glove then arises, while avoiding a breach of the seal in the enclosure and also reducing the risk of contact with the used glove.

It is known, from document FR 2 685 2(44), with a method for changing a glove fixed to a cuff by means of a ring, as described previously. This method involves firstly isolating the glove from the inside of the enclosure by means of a stopper before effecting the change, and then placing a new glove on the ring on top of the used glove from the outside of the enclosure, then inserting one's hand into the new glove and detaching the used glove from the ring. The used glove is located inside the enclosure and must then be removed.

This method is quite complex to execute, and it provides no solution for removing the used glove.

Furthermore, the method for fixing the glove onto the enclosure requires the use of a relatively thick material, thus reducing the dexterity of the movements and the sensitivity in terms of touch, which can be very disadvantageous in certain circumstances.

There also exists a glove with a ring around its opening, onto which is attached a cap so that when the glove is turned inside out, the inside of the glove is isolated from the outside environment. This glove is intended to be fixed on a ring, with said opening being closed off by a cap. The glove is attached to the enclosure, by bayonet-type means, by rotating the ring of the glove in relation to the ring of the enclosure. A hand is then inserted into the glove and the two caps are removed simultaneously so that one can enter into the enclosure.

This arrangement is very efficient and very reliable, both in terms of the integrity of the isolation and the cleanliness of the glove, but the glove and the fitting arrangements are relatively complex.

It is known, from document WO 98/24599, with a system for the fitting of a glove to a cuff. The glove is attached to a ring and the cuff includes a ring into which the ring of the glove is inserted in a sealed manner, with the axial immobilisation of the glove ring in the cuff ring being achieved by means of two o-rings fitted in grooves on the outer periphery of the glove ring and forming an axial stop. To change the glove, it is necessary to remove a first o-ring from the ring of the used glove, to fit it to the ring of the new glove, and to partially remove the ring of the used glove from the cuff ring. A part of the ring of the new glove is then inserted into the cuff ring, the ring of the used glove simultaneously slides toward the outside of the cuff ring, and the ring of the new glove slides toward the inside of the cuff ring. Finally, when the ring of the used glove has been completely removed, the other o-ring of the ring of the used glove is placed on the ring of the new glove.

This operation to change a glove is lengthy and tedious. Moreover, nothing guarantees continuity of the isolation between the outside environment and the inside environment, and finally the manipulation of the new glove is necessarily effected with a used glove, so that it is vulnerable to soiling.

One aim of this present invention is therefore to offer a glove-changing arrangement that provides a high degree of reliability in respect of both sealing and handling.

Another aim of this present invention is to offer a glove-changing arrangement that is easy and quick to execute.

DISCLOSURE OF THE INVENTION

The aims listed above are attained by a glove-changing arrangement or device for manipulation in confined spaces with one part that is intended to be positioned within the enclosure, and receiving a new glove in a first step, and a second part that is intended to be positioned on the outside of the enclosure and receiving a used glove in a second step. The glove of this present invention includes a ring around the opening of the glove, with the ring of the glove being designed to be attached to the enclosure and to be detached from the enclosure by the application of an axial force.

In other words, the fixing of the new glove to the enclosure is effected simultaneously with the removal of the used glove by the application of a pushing force, with the new glove being on the inside of the enclosure and the used glove being on the outside of the enclosure for its removal.

This present invention offers the advantage of being capable of fitting sterile gloves, since any manipulation of the new glove is effected in a confined atmosphere. Thus it can be arranged to fit the sterile glove contained in a closed pocket and to open this pocket only in the enclosure. Conversely to the first example described from the prior art, the new glove is fitted on the outside of the enclosure, which in principle is not sterile.

The present invention thus mainly provides a device to change a glove for manipulation in confined spaces including a part to receive the hand, in a flexible material, and a ring on a longitudinal axis around an opening in the glove for insertion of the hand, said ring also having means for attachment to an element fixed to a containment enclosure, said element including a ring with a diameter that is substantially equal to the outside diameter of the first sleeve and including locking means to mate with the locking means of the glove, said attachment means being designed to be locked and unlocked by application of a substantially axial force, and said attachment means being attached to said ring, wherein the device includes a support that has a cavity to receive a new glove, a push device that has a cavity to receive a used glove, and means to transfer the new glove from the support to the enclosure taking the place of the used glove, and to transfer the used glove from the enclosure to the push device.

The cavity of the support can have a diameter that is substantially equal to the outside diameter of a second sleeve of glove ring, the glove comprising a ring including a first sleeve of larger diameter and a second sleeve of smaller diameter, connected by an annular face can have The cavity of the push device can have a diameter that is substantially equal to the outside diameter of the first sleeve of the glove ring.

For example the push device includes a push area that is intended to bear against the end face of the ring of the fixing element, where said push area has a shape that is complementary to that of the end face of the ring of the element.

Advantageously, the cavity of the push device includes a means for the retention of a glove ring, to avoid the glove ring to fall when the push device is moved.

In an advantageous manner, the device according to the invention, including means for assisting with the glove change so as to ensure application of a constant load on the ring of the new glove, in order to guarantee correct fitting.

In a very interesting embodiment, the support includes a body and a piston that is mobile axially in an axial bore in the body, said piston being intended to transfer a protection cap the new glove from the used glove, from the ring of new glove to the ring of used glove, with said piston being maintained in a rest position by a return means to allow positioning of the new glove in the cavity of the support.

The piston can slide in the body between a first position in which the piston is projecting from an outer end of the body opposite to the cavity, and a second position in which the piston is projecting from the bottom of the cavity.

For example the piston includes a base on the side opposite to the cavity of the body and a disk in the cavity that is intended to come into contact with the protection cap.

The return means can be are formed by a spring positioned between the base and the body of the support.

The present invention also mainly provides a system to change a glove comprising a device to change a glove according to the invention and at least one protection cap, said protection cap being intended to be mounted in a ring of a new glove before glove change.

The present invention also mainly provides a method to change a glove in using a device according to the invention, including the following steps:

a) positioning a new glove in the cavity of the support, b) positioning the push device bearing onto the ring of the enclosure to which the used glove is attached, c) positioning the ring of the used glove inside the ring of the new glove, d) transferring the used glove from the ring of the enclosure to the cavity of the push device and simultaneous transferring of the ring of the new glove from the cavity of the support to the ring of the enclosure, by applying a force from the push device to the support.

The method can include a step prior to step a), for positioning, in the enclosure, of at least one new glove and of the support.

The method can also include a step prior to step b) for turning the used glove.

The method using a system to change a glove according to the invention comprises advantageously a step prior to step a) for positioning a protection cap in the ring of the new glove.

The new glove is then permanently isolated from the used glove, and the cap, then transferred onto the ring of the used glove, advantageously confines the used glove.

The method can include a step prior to step d) for transferring the cap of the ring of the new glove to the ring of the used glove, by the application of a push force of first intensity to the push device in the direction of the support.

During step d), the transfer can be effected by the application of a force of a second intensity, that is greater than the first intensity, to the push device, in the direction of the support to transfer the ring of the new glove from the support to the ring of the element and to transfer the ring of the used glove from the ring of the element to the push device.

The method according to this present invention can include a step following step d) for removal of the push device loaded with the used glove and for removal of the ring of the new glove from the support.

BRIEF DESCRIPTION OF THE DRAWINGS

This present invention will be understood better with the aid of the description that follows and of the appended drawings, in which.

DETAILED PRESENTATION OF PARTICULAR EMBODIMENTS

Figure 1A:
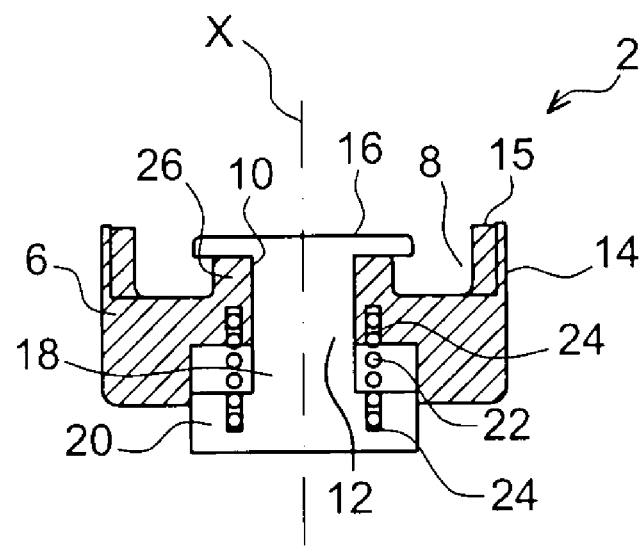
FIGS. 1A and 1B are sectional views of a glove-changing arrangement according to this present invention.
Figure 1B:
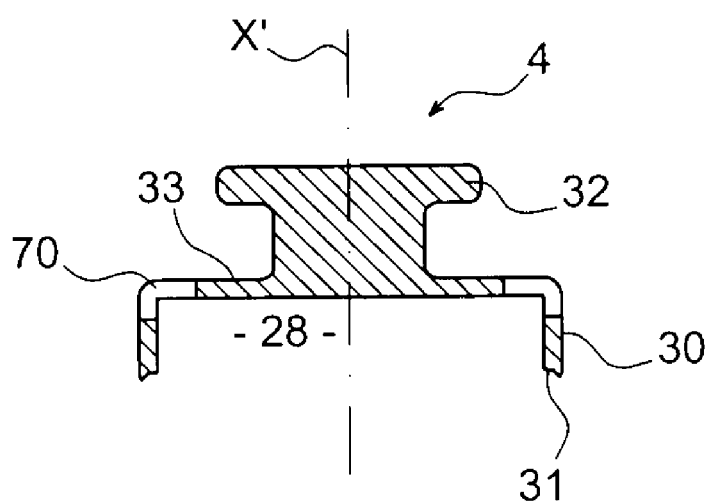

In FIG. 1, we can see a glove-changing arrangement according to this present invention including a support 2 and a push device 4. In the represented example, the support 2 and the push device 4 substantially take the form of a revolution about an axis, these axes being X and X' respectively.

The support 2 includes a body 6 of axis X in which a central cavity 8 is created that is intended to receive a new glove (G), and a bore 10 also of axis X, passing right through the body 6. The support also includes a piston 12 fitted so that it is mobile in the bore 10 and opening onto either side of the body in an axial direction.

The body includes an annular end face 15 surrounding the cavity and substantially perpendicular to the axis of the cavity. The cavity has an inside diameter that is substantially equal to that of a sleeve of smaller diameter 40 of a ring 36 of a glove according to this present invention, which will be described below.

At a first axial end 14, the piston 12 includes an applicator formed by a disk 16 and, at a second end 18, a base 20. The disk 16 and the base 20 advantageously have an outside diameter that is greater than the diameter of the bore 10. Thus the piston 12 is prevented from escaping from the bore 10.

The support also includes a return means, a helical spring 22 for example, to return the piston to a rest position.

This rest position is that in which the disk is bearing onto an end of the cavity 8 of the body 6.

The spring is fitted in a reaction configuration between the body 6 and the base 20. In an advantageous manner, the body 6 and the base 20 respectively include annular facing grooves 24 to receive the longitudinal ends of the spring 22, for better maintenance and guidance.

Thus at rest, the base 20 is projecting to the outside of the body 6 and the disk 16 is pressed against the bottom of the cavity 8.

In the example represented, the bottom of the cavity 8 includes a circular projection 26 substantially at the centre of the cavity 8, on which the disk bears at rest. This projection is used to reduce the travel of the piston during the process of replacing the glove.

In the represented example, the glove is attached to ring 36 by means of a collar 37 on which two diametrically opposite heads can be seen, and diametrically opposite grooves 27 are then provided on the inside wall of the cavity 8 to allow the passage of this head.

The push device 4 includes a cavity 28 on longitudinal axis X', bordered by an annular wall 30 equipped with an end face 31 and a grasping means 32 attached to an end 33 of the cavity 28, such as a handle in the shape of a disk for operating the push device 4. The cavity has an inside diameter that is substantially equal to that of the outside diameter of a sleeve of larger diameter 38 of the glove ring 36.

The cavity 28 also includes a means 35 to retain a glove ring. This means can, for example, be formed by a nipple projecting from the inside wall of the cavity 28 in order to apply a substantially radial pressure on the ring and/or a temporary adhesive applied onto the same wall.

Figure 2:
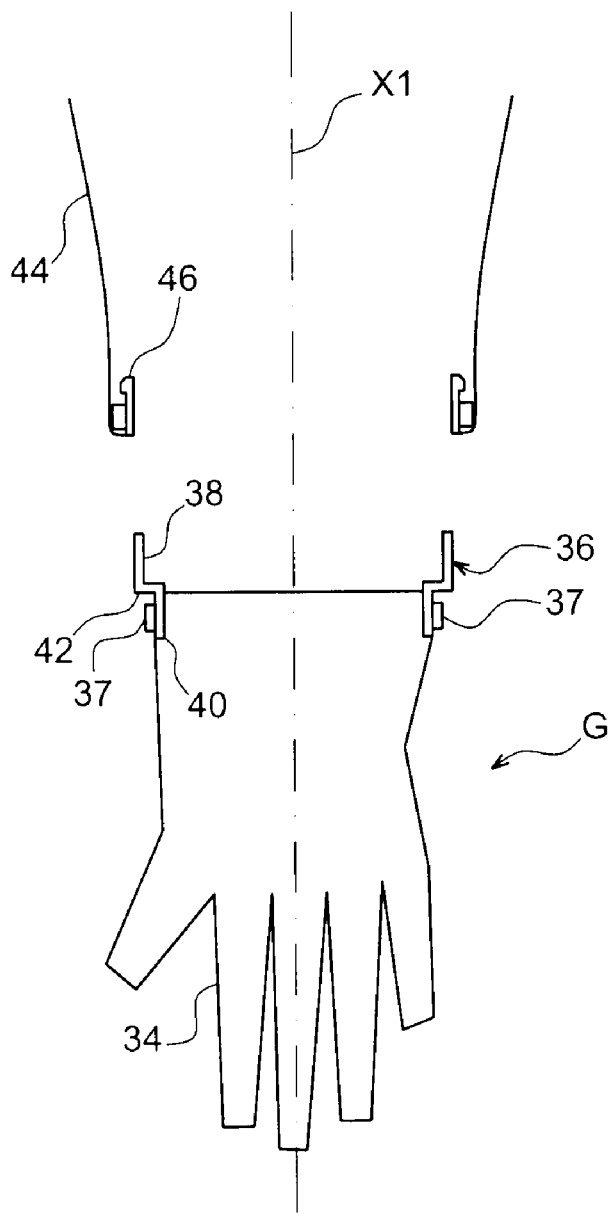
FIG. 2 is a sectional view of a glove according to this present invention, designed to be changed by the device of FIG. 1.

A glove G (in FIG. 2) according to this present invention includes a glove in a flexible material 34 for protection of the hand, and an annular ring 36 around the opening of the glove 34.

In the remainder of the description, the reference 36 relates to the ring of the new glove and the reference 136 relates to the ring of the used glove. Rings 36 and 136 have the same structure, and the description of ring 36 also applies to ring 136.

In the embodiment example represented, ring 36, of axis X1, includes a first sleeve 38 of larger diameter and a second sleeve 40 of smaller diameter connected by an annular connecting ring 42. The flexible glove 34 is attached to the sleeve of smaller diameter 40.

This configuration with two sleeves 38, 40 advantageously improves stability, ensures centering of ring 36 of the new glove and ring 136 of the used glove, and is used to maintain a volume in order to allow passage of the collar 37, particularly the collar head or any other means of assembly of the glove 34 on ring 36.

One could also envisage using a ring formed by a single sleeve.

The glove 34 is made, for example, from polyethylene, polyvinyl chloride or any other material that is compatible with a sterile enclosure, and rings 36 and 136 are advantageously made from a plastic material such as polyethylene.

It is also possible to envisage simultaneous manufacture of the ring and the glove by co-injection or overmolding the ring onto the glove. One could also consider fixing the ring onto the glove by gluing or heat-welding for example.

As described previously, the attachment of the glove onto the ring can be effected by an additional ring that is clipped on or click fitted, or by a heat-shrink ring. The choice of the assembly will take account of the compatibility of the materials.

In this embodiment, the glove is intended to be fixed to a cuff 44 forming protection for the arm, so that the manipulator has greater freedom in which to work.

The cuff 44 is attached by a first end (not shown) to a wall of an enclosure, and in particular this end surrounds an opening created in the wall for passage of the arm and, at a second end, includes a ring 46 that is intended to mate with ring 36.

In the represented example, ring 46 is attached to the inside of the cuff 44, and it can be manufactured simultaneously with the cuff by moulding, in a manner similar to the fabricating of the glove 34 and of ring 36. The materials of the cuff and of the ring can also be the same as those of the glove 34 and of ring 36.

One can consider using a stronger material for the cuff since, in the represented example, it is not intended to be changed frequently.

A glove G including a first part to receive the hand and a second part to receive the arm created in a single operation, does not fall outside of this present invention. Ring 36 is then attached to the end of the cuff and mates with ring 46 attached to the wall of the enclosure.

In an advantageous manner, ring 36 and ring 46 fit together by a click-on operation.

According to this present invention, the means for attaching glove ring 36 onto cuff ring 46 are attached to glove ring 36, which means that, in this present application, they form an integral part of the glove ring 36 and are not intended to be dismantled so as to allow the fitting of ring 36 onto ring 46.

In the example represented, these attachment means are created from the material of glove ring 36.

One can arrange to attach these by gluing or by any other means.

The means for attaching the glove 34 onto ring 46 are attached to ring 36 in a sufficiently rigid manner to prevent them from separating from ring 36 during a transfer operation.

Ring 36 includes an annular face 48 that is substantially perpendicular to the axis of the ring and forms a retention stop.

For its part, ring 46 includes an inside shoulder 50 oriented in the direction of the first end of the cuff. After the interlocking of glove ring 36 with cuff ring 46, the annular face 48 is positioned in front of the shoulder 50 in the direction of insertion of the glove ring 36 into the cuff ring 46 indicated by the arrow 52.

Thus, the movement of the glove in the reverse direction to that of insertion is limited by the rim (48) pressing up against the shoulder 50.

The annular face 48 has a face of tapered shape oriented in the direction of insertion of ring 36 into ring 46, thus facilitating the insertion of ring 36 into ring 46.

The sleeve 38 also includes a rear stop 56 carried by its longitudinal end close to the sleeve of smaller diameter 40, and which is intended to come into contact with the rear end face 55 in the direction 52 of cuff ring 46. Thus the glove ring 36 is prevented from moving in the direction of insertion beyond a limit determined by the rear stop.

In the example represented, this stop 56 is formed by an annular rim 58 projecting radially from the outer periphery of the sleeve 38, and substantially perpendicular to the axis of glove ring 36.

In the example represented, the distance separating the annular face 48 from the rear stop 56 is designed to be slightly greater than the distance separating the shoulder 50 from the rear end face 55 of cuff ring 46.

If the dimensions of the first sleeve allow it, the rear stop 56 can be positioned other than at the end of the first sleeve on the side of the annular face 48.

The rear stop 56 and the tapered projection 54 bearing the rim 48 are advantageously created in a single operation by moulding with ring 36.

One can also envisage creating surfaces 48 and 58 so that they are not continuous.

The attachment of the glove onto the cuff is therefore very simple and very rapid. Furthermore, during the fitting, the operator is able to feel the passage of hard points formed by the click-fit means, forming an indicator of completion of the fixing operation. The operator is then sure of having finished the glove transfer, and there is no risk of removing the push device with the used glove before definitive and reliable fitting of the new glove onto the cuff.

The attachment of the glove onto the cuff, and in general onto any element attached to the enclosure, can also be effected other click-fit means, such as by at least small elastic tab carried by glove ring 36 penetrating into an orifice in cuff ring 46.

One can also envisage effecting the attachment of the glove on the cuff 44 by means of a friction fit. One can envisage the provision of means that create a very high degree of friction between the outer surface of the first sleeve of glove ring 36 and the inside wall of cuff ring 46, with these frictions being sufficiently large to hold the glove and the cuff together during normal use and insufficient to prevent the glove ring from slipping in relation to the cuff ring by the application of a given force.

In the represented example, glove ring 36 is inserted into cuff ring 46, but one can also consider inserting cuff ring 46 into glove ring 36.

Ring 46 includes a front end face 62 in the direction of insertion 52, which is intended to mate with the end face 31 of the push device. In an advantageous manner, faces 31 and 62 include means to centre one of these in relation to the other. In the example represented, these centering means are formed by a central part 64 that is substantially perpendicular to the axis of ring 46 and an outer part 66 that is substantially tapered, carried by the face 62, and surfaces of corresponding shape carried by the face 31 of the push device.

Furthermore, these particular shapes ensure the lateral retention of the push device in relation to ring 46, thus preventing any lateral slippage of the push device in relation to ring 46 when a push force is applied to the push device in the direction of ring 46.

One can also consider placing the tapered part on the inside and the perpendicular surface on the outside.

In an advantageous manner, the new glove G includes a cap 60 that is intended, in a first step, to protect the inside of the glove from external pollution. The cap 60 is fitted in ring 36. The cap has an outside diameter that is slightly greater than the inside diameter of the second sleeve 40 so as to allow it to be force-fitted into the second sleeve 40. In a second step, this cap is used to isolate the new glove from the used glove, and to enclose the flexible part of the used glove on the inside of its ring.

One can consider placing adhesive on the cap and/or on the ring in order to improve retention of the cap in ring 36. This adhesive is advantageously of moderate strength so as not to increase the force required to transfer the cap 60, and in order to make this force repeatable, since the latter is linked to calibrating the spring 22 of the tool.

Figure 7A:
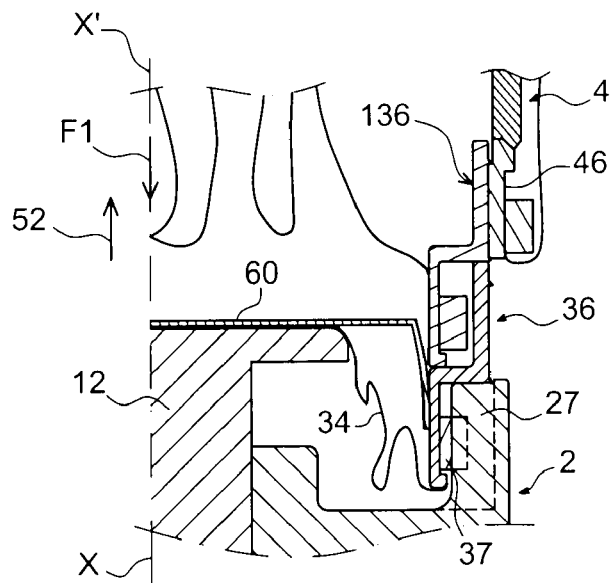
FIGS. 7A and 7B are views of a variant embodiment of the first embodiment.
Figure 7B:
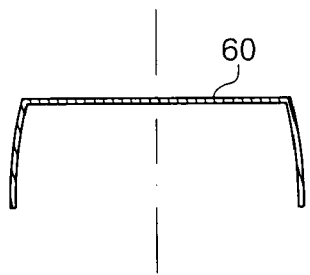
Figure 8:
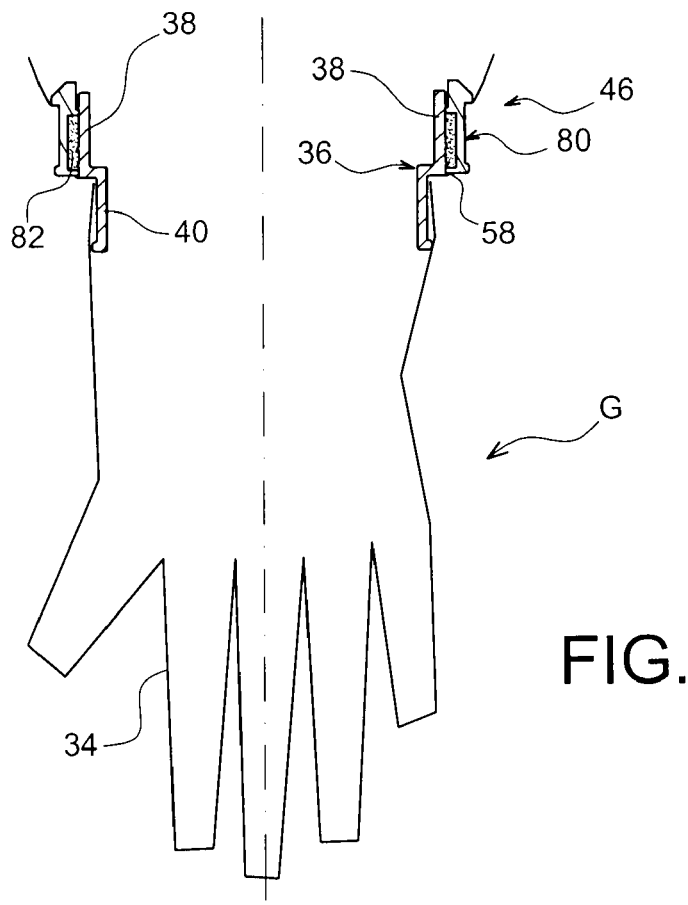
FIG. 8 is a sectional view of a glove and of its cuff according to a second embodiment.

It is then possible to provide a cap of tapered shape that provides sufficient adhesion to the inside of the sleeve 40, as represented in FIGS. 7A and 7B.

FIG. 7 represents the glove during the transfer phase of the cap 60.

This embodiment variant advantageously results in better centering between the rings 36 and 136 and the tool 12.

This cap can be made from a plastic material, by moulding for example.

Figure 2A:
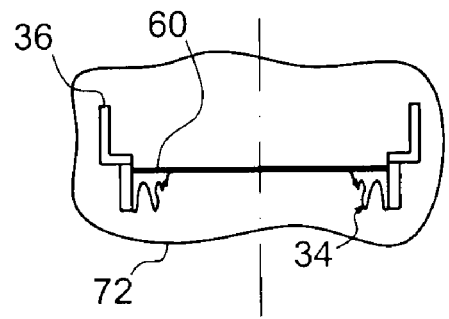
FIG. 2A is a sectional view of a new glove in a protective pocket according to this present invention.

In an advantageous manner, the glove G of this present invention is supplied with a cap 60 fitted to ring 36 and enclosed in a sealed pocket 72 so as to protect it from outside contamination (FIG. 2A).

However one can also envisage positioning the cap just before changing the glove.

As will be described in detail in what follows, one advantage of the glove fitted with a cap is that it isolates the outer surface of the used glove, which can be soiled by dangerous particles, from the inside of the glove that receives the hand of the manipulator.

However, in cases where the handled products are not dangerous, where one is seeking to work in an atmosphere that is protected from external pollution, the isolation of the outer surface of the used glove from the inside surface of the new glove is not necessary. It is then possible to arrange for fitting of the gloves without the cap. In this case, the fitting support 2 does not need to include a piston 12 for transfer of the cap 60 from the new glove to the used glove.

In FIGS. 8 to 11, we can see an embodiment that is particularly designed for sterile atmospheres, for which on is seeking to maintain continuity of sterility in a confined atmosphere.

The same references as those used for the description of the first embodiment will be used to describe the elements performing the same functions.

In this embodiment, provision is made for sealing means 80 between glove ring 36 and cuff ring 46.

Figure 9A:
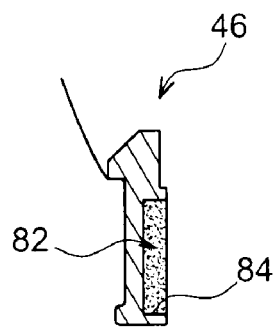
FIGS. 9A and 9B are detail views of FIG. 8, FIGS. 10A to 10E are detail views of the different steps of a glove change according to the second embodiment.
Figure 9B:
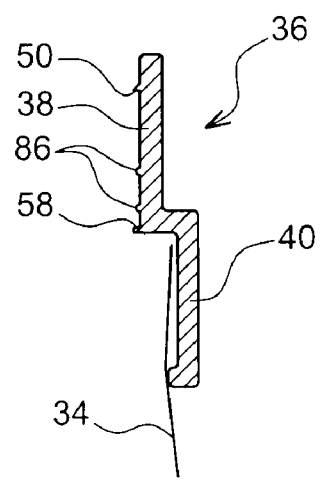

In the represented example, the sealing means 80 include a ring 82 (in FIG. 9A) in a flexible elastomer carried by ring 46 and positioned in a groove 84 in the inside wall of ring 46, and annular rims 86 represented in FIG. 9B projecting from the outer wall of the sleeve 38 of ring 36 and intended to come into contact with flexible ring 82.

The outside diameter of the rims 86 is slightly greater than the inside diameter of ring 82 in order to place the elastomeric material in compression and to confirm the sealing. comprising a device to change a glove for manipulation in confined spaces including a part to receive the hand in a flexible material, and a ring on a longitudinal axis around an opening in the glove for insertion of the hand, said ring also having means for attachment to an element fixed to a containment enclosure, said element including a ring with a diameter that is substantially equal to the outside diameter of the first sleeve and including locking means to mate with the locking means of the glove, said attachment means being designed to be locked and unlocked by application of a substantially axial force, and said attachment means being attached to said ring, wherein the device includes a support that has a cavity to receive a new glove, a push device that has a cavity to receive a used glove, and means to transfer the new glove from the support to the enclosure taking the place of the used glove, and to transfer the used glove from the enclosure to the push device, the support including a body and a piston that is mobile axially in an axial bore in the body, said piston being intended to transfer a protection cap the new glove from the used glove, from the ring of new glove to the ring of used glove, with said piston being maintained in a rest position by a return means to allow positioning of the new glove in the cavity of the support, and at least one protection cap, said protection cap being intended to be mounted in a ring of a new glove before glove change.

During the fitting of the glove onto the cuff 44, the rims 86 come into contact with ring 82 and compress the latter to effect sealing of the assembly between ring 36 and ring 46.

One can equally well envisage placing ring 82 on the glove and the rims on cuff ring 46.

One can also envisage doing without ring 82 by using materials that are designed to offer sufficient flexibility, at least locally, to guarantee the sealing.

In an advantageous manner, the means are provided for angular orientation of the gloves in relation to the cuff 44 in order to ensure correct orientation of the fingers. In fact, the sealing means 80 limit the angular movement of the glove in relation to the cuff, then rendering it difficult to change the position of the glove.

To this end, a visible marking can be provided on rings 36 and 46 to ensure good angular registration, although this does not have to be excessively precise.

Marking can also be provided between the glove and ring 36.

According to the second embodiment, the glove is suitable for use in the pharmaceutical field or in other fields calling for sterile enclosures.

Figure 11:
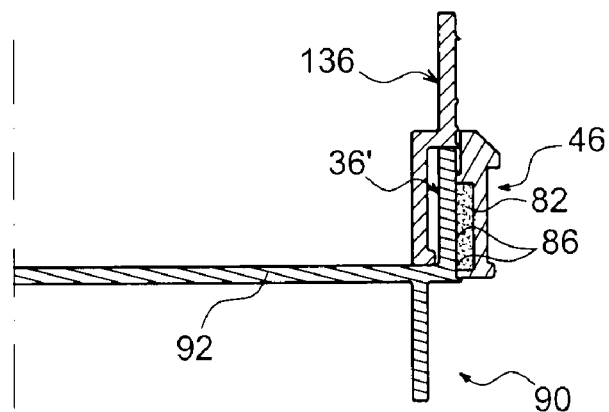
FIG. 11 is a partial sectional view of a temporary stopper taking the place of a new glove.

FIG. 11 shows a cap 90 fitted in place of a new glove, during the initial sterilisation of the enclosure for example, or during a break in the stock of new gloves, or when the glove is damaged and in the event of an emergency. A glove then remains in position on the cuff in order to allow later transfer to be performed with a new glove. This cap 90 includes an outer ring 36', whose central passage is closed by a transverse wall 92. Its positioning is similar to the positioning of a new glove, and so will not be described.

In an embodiment variant, the tool 12 can include means designed to generate a transfer of rings 36 and 136 without the operator needing to measure the manual push force for this operation. Thus any risk of an incomplete operation is eliminated. This is particularly useful in the second embodiment, since it ensures that the sealing will be maintained correctly.

These means can be of the re-arming type, with a tensioned spring designed to release its energy during the transfer.

We will now explain the method employed to change a glove according to this present invention. This method is the same for both embodiments.

The description will be given with reference to FIGS. 3A to 3I of the first embodiment.

The method to change a glove includes the following steps:
a) positioning a new glove in the cavity of the support,
b) positioning the push device bearing onto the ring of the enclosure to which the used glove is attached,
c) positioning the ring of the used glove inside the ring of the new glove,
d) transferring the used glove from the ring of the enclosure to the cavity of the push device and simultaneous transferring the ring of the new glove from the cavity of the push device to the ring of the enclosure.

In the remainder of the description, we will now describe the different steps of the method used to change a glove according to this present invention.

The references indicating the elements of the used glove will again use the references indicating the same elements of the new glove, with 100 added.

The support is positioned in the containment enclosure, where it can remain permanently. At least one sterile pocket containing at least one new glove (G) is also inserted into the enclosure. For its part, the push device 2 is stored on the outside of the enclosure. The push device is not in contact with the new glove and is only in contact with the used glove.

Figure 3A:
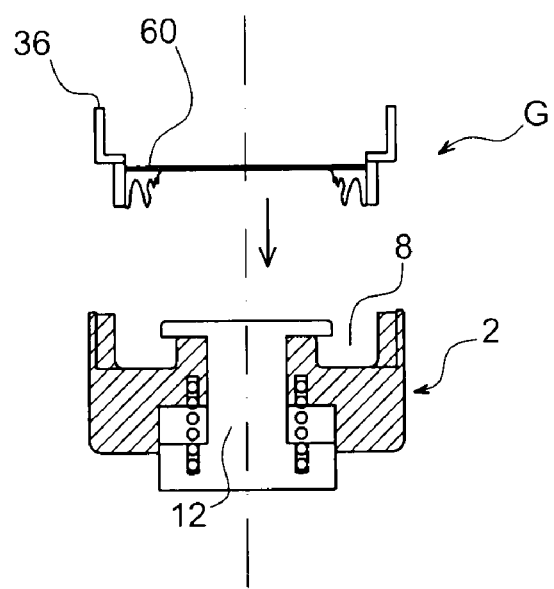
FIGS. 3A to 3I are sectional views of the different steps executed in order to change a glove of FIG. 2 with a device according to FIG. 1.
Figure 3B:
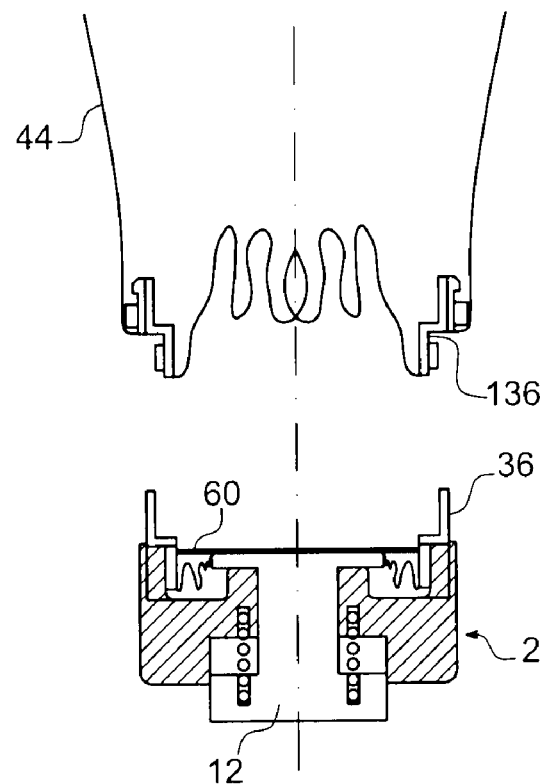
Figure 3C:
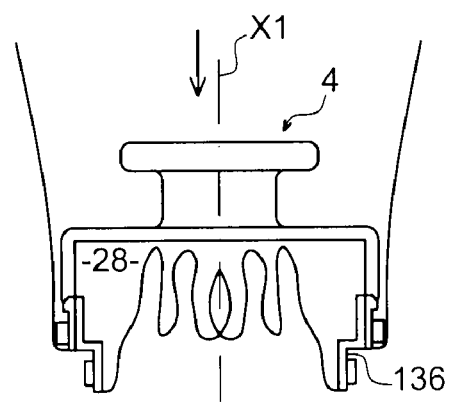
Figure 3C:
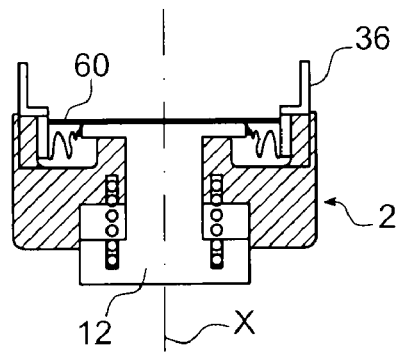
Figure 3D:
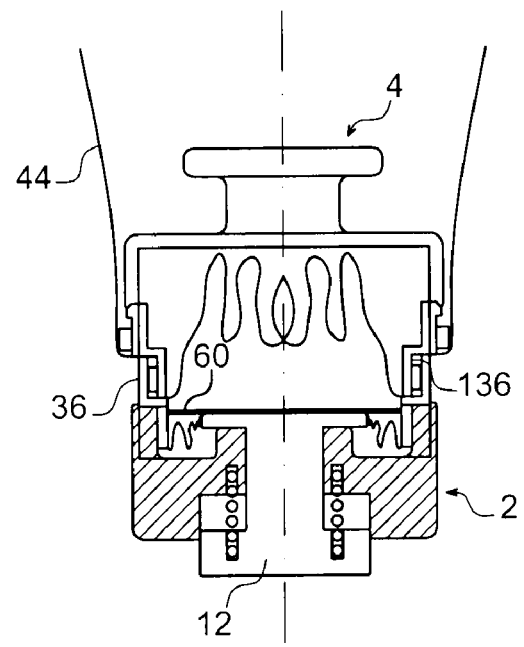
Figure 3E:
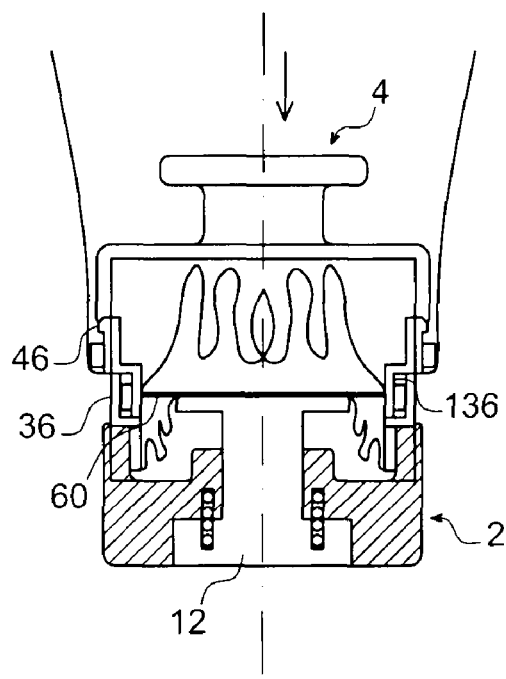
Figure 3F:
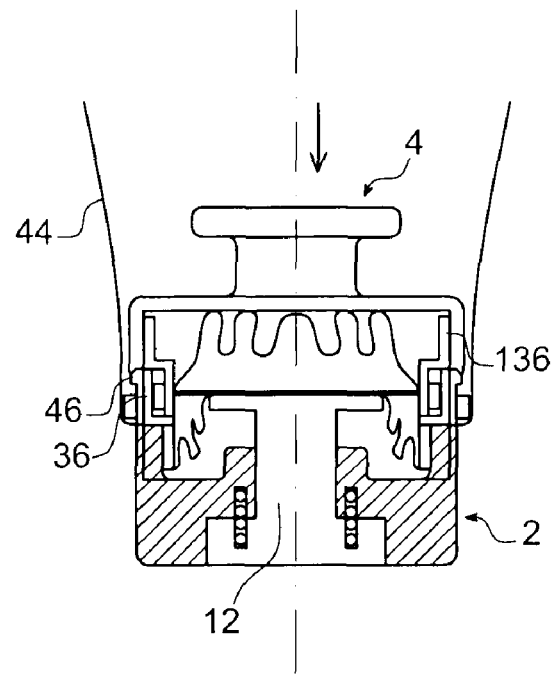
Figure 3G:
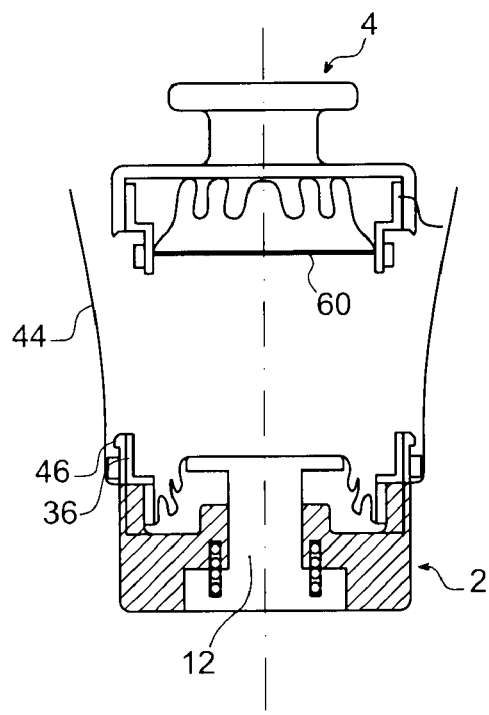

In FIG. 3A, during step a) we can see the positioning of a new glove G according to this present invention on a support 2, after removal of the pocket 72. Ring 36 is inserted into the cavity 8 by its sleeve of smaller diameter 40, with the shoulder then bearing onto the end face 15. The cap 60 rests on the disk of the piston, the new glove 34 is then contained between the cap 60 and the bottom of the cavity 8, and axes X and X1 are then substantially aligned.

The used glove is then advantageously turned inside out (FIG. 3B), meaning that the parts that are intended to cover the fingers are turned to the inside of the glove. This turning inside out can be effected quite simply when the user removes his or her hand, without the need for any additional operation.

Figure 5:
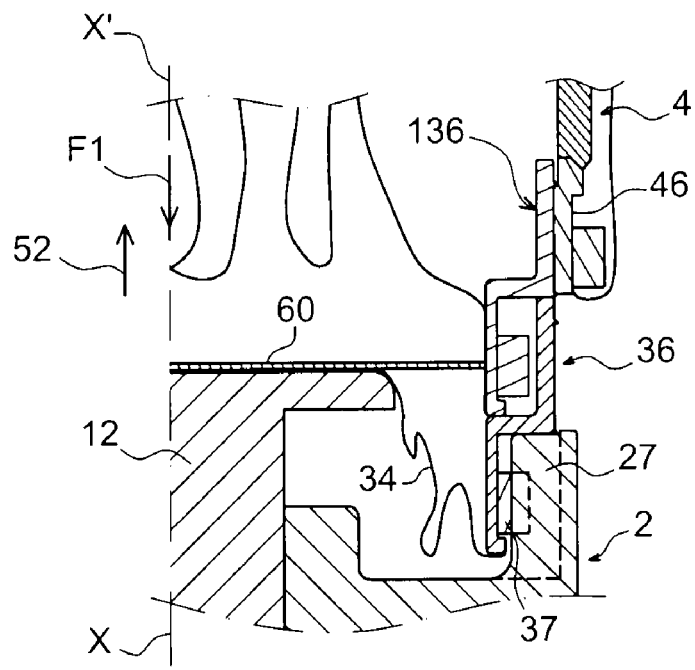
FIG. 5 is a detail view of FIG. 3E.

During step b), the push device 4 is positioned on the inside of the cuff 44 via the outside of the enclosure, so that annular end wall 33 of the push device 4 presses against the end face 162 of ring 46 of the cuff, leaving free the end of ring 136 of the used glove, oriented to the inside of the push device (FIG. 5).

During step c), ring 136 of the used glove is placed in ring 36 of the new glove, and in particular the second sleeve 140 of ring 136 of the used glove is placed in the first sleeve 38 of the ring of the new glove, so as to align axes X and X'.

During step d) (FIGS. 3E and 5), a first push force F1 is applied to the push device 4, particularly on the handle 32 in direction 68, causing movement of the body in relation to the piston and against the spring 22, with the applicator 16 then projecting from the bottom of the cavity 8, and displaces the cap 60, which slides into the second sleeve 40 of ring 36, and then into the second sleeve 140 of ring 136 of the used glove. The cap 60 is then held forcibly in the second sleeve 140.

Figure 6:
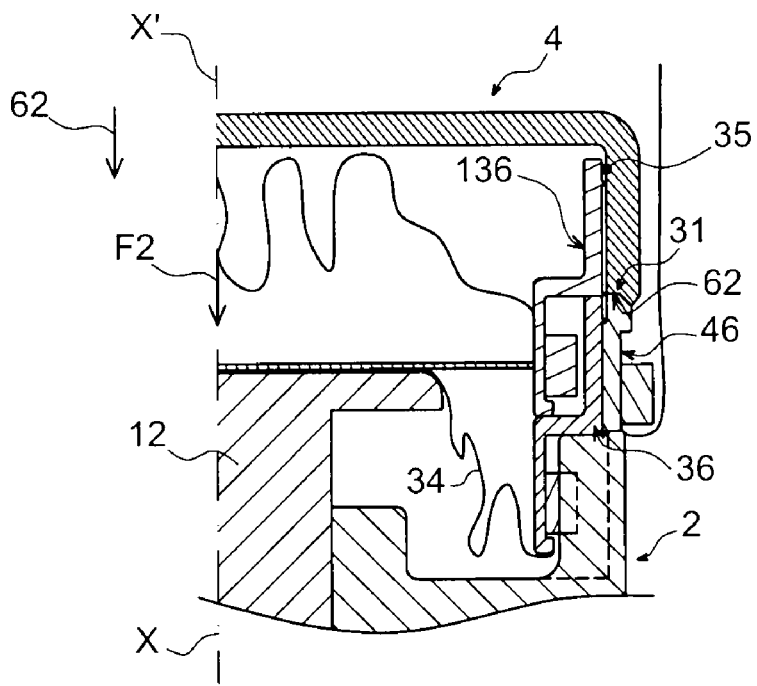
FIG. 6 is a detail view of FIG. 3F.

A second force F2 of an intensity that is greater than that of F1, is applied to the push device in direction 68, causing the sliding of the first sleeves 38 and 138 (on FIGS. 6 and 3F), so that sleeve 138 is located then in the cavity 28 of the push device and sleeve 38 is located in ring 46.

The rear stop lifts off the rear face 55 of ring 46 after application of the push force F2, releasing the sleeve of ring 46.

The sleeve 38 is then in a sufficiently forward position to allow a click fit of ring 36 on ring 46.

The push device is then withdrawn (FIG. 3G) taking with it the used glove enclosed in its ring 136 by the cap 60 and maintained in the cavity of the push device.

Figure 3H:
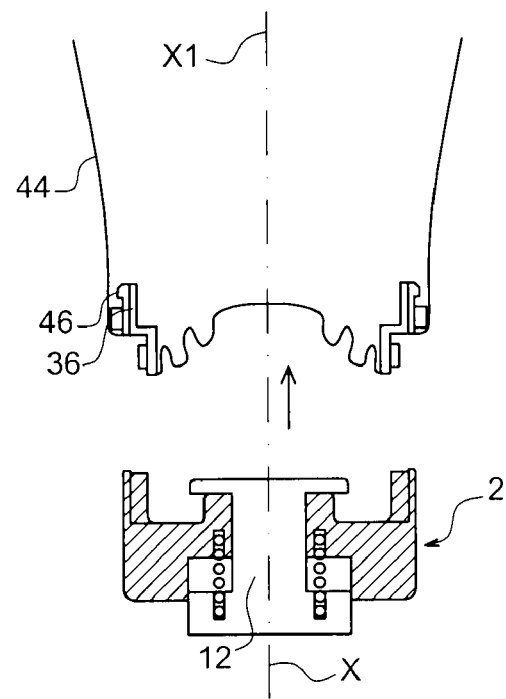
Figure 3I:
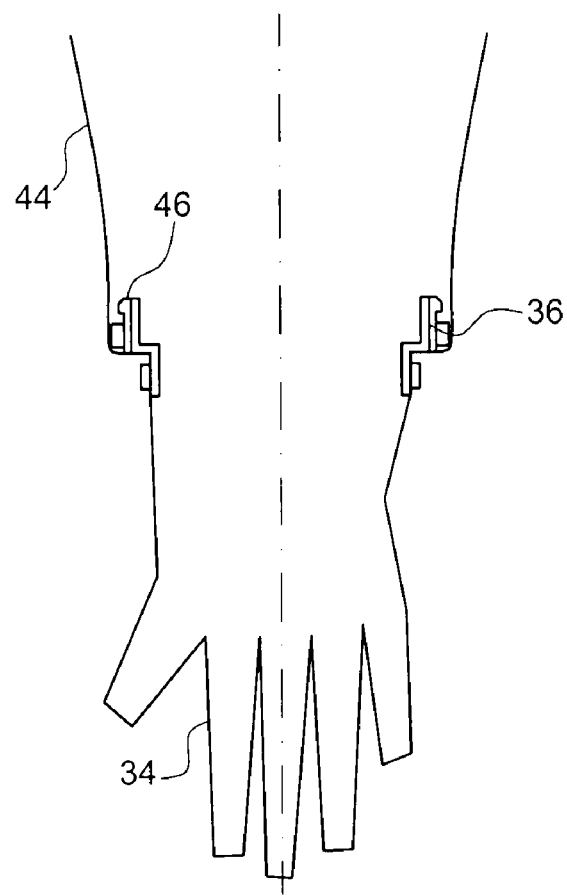
Figure 4:
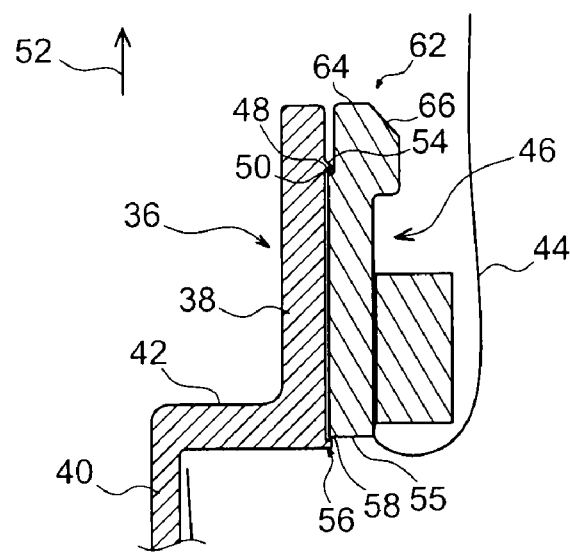
FIG. 4 is a detail view of FIG. 3I.

The piston 12 is returned to the rest position by the spring 22 and the sleeve fitted with the new glove is removed from the support 2, with the new glove then being usable (FIG. 3H).

The used glove is removed from the push device, for example by applying a push force to the cap 60 with the aid of a suitable tool, through at least one orifice 70 created in the bottom of the cavity 28 of the push device to provide access to the cavity from the outside.

Thus, there is no contact between the used glove and particularly the outer surface of the glove in contact with objects manipulated in the enclosure, or with the outside environment. There is also no contact with the push device, and the latter therefore does not need to be cleaned after use.

The used glove, as well as the cap, can be stored for recycling or destruction.

In the case where the new glove includes no cap, the change of glove is effected as previously, and it is not necessary to apply the first force F1. Furthermore, to remove the used glove from the push device, one only has to apply traction to ring 136 of the used glove in order to remove it from the cavity of the push device.

In FIGS. 10A to 10E, we can see the different steps of a glove change according to the second embodiment, but only the rings 36 of the gloves and ring 46 of the cuff are represented.

Figure 10A:
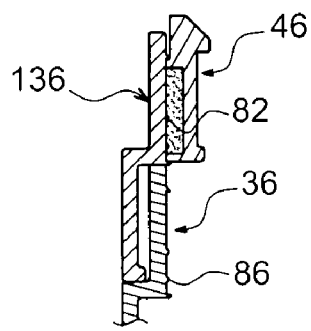

In FIG. 10A, the used glove is placed in the ring, the new glove waits to be fitted.

Figure 10B:
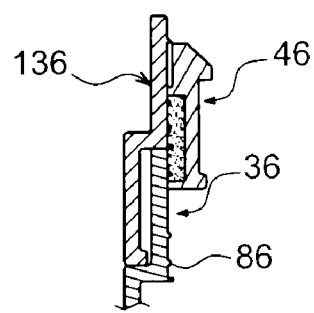
Figure 10C:
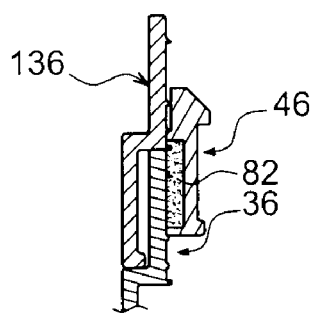
Figure 10D:
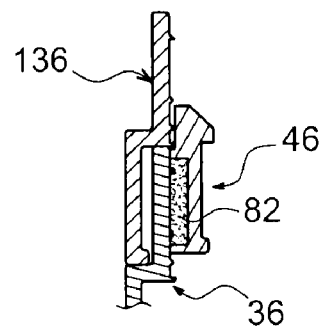

In FIGS. 10B to 10D, the transfer has take place progressively, and ring 36 of the used glove is ejected from ring 46.

Figure 10E:
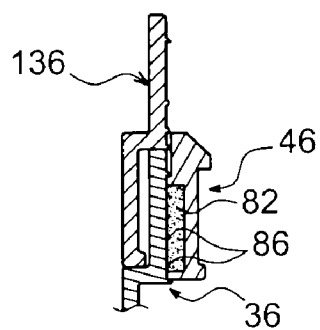

In FIG. 10E, the change of glove is complete, ring 36 of the new glove is fitted in ring 46 of the cuff 44, and the used glove is ready to be removed.

This present invention allows a glove change to be executed in a manner that is simple, reliable and rapid.

The invention claimed is:

1. A device to change a glove for manipulation in confined spaces, said device configured to replace a used gloved with a new glove, each glove including:
   a part to receive a hand in a flexible material,
   a glove ring having a longitudinal axis, said glove ring surrounding an opening of the glove for insertion of the hand,
   said glove ring including means for attachment to a fixing element fixed to a containment enclosure,
   said fixing element including an element ring having a diameter that is substantially equal to an outside diameter of a first sleeve of the glove ring and including locking means to mate with locking means of the glove,
   said attachment means being designed to be locked and unlocked by application of a substantially axial force parallel to the longitudinal axis, and
   said attachment means being attached to said element ring, the device comprising:
   a support that has a cavity to receive the new glove,
   a push device that has a cavity to receive the used glove, and
   means to transfer the new glove from the support to the containment enclosure taking the place of the used glove, and to transfer the used glove from the containment enclosure to the push device.

2. The device according to claim 1, the glove ring including a second sleeve of having a diameter which is smaller than a diameter of the first sleeve, the first sleeve and the second sleeve connected by an annular flange, wherein the cavity of the support has a diameter that is substantially equal to an outside diameter of the second sleeve of glove ring.

3. The device according to claim 2, wherein the cavity of the push device has a diameter that is substantially equal to the outside diameter of the first sleeve of the glove ring.

4. The device according to claim 1, wherein the push device includes a push area that is intended to bear against an end face of the element ring of the fixing element, where said push area has a shape that is complementary to that of the end face of the element ring.

5. The device according to claim 1, wherein the cavity of the push device includes a means for retaining a glove ring.

6. The device according to claim 1, including means for assisting with the glove change so as to ensure application of a constant load on the glove ring of the new glove, in order to guarantee correct fitting.

7. The device according to claim 1 wherein the support includes a body and a piston that is mobile axially in an axial bore in the body, said piston configured to transfer a protection cap to the new glove from the used glove, from the glove ring of new glove to the glove ring of used glove, with said piston being maintained in a rest position by a return means to allow positioning of the new glove in the cavity of the support.

8. The device according to claim 7, wherein the piston can slide in the body between a first position in which the piston is projecting from an outer end of the body opposite to the cavity, and a second position in which the piston is projecting from the bottom of the cavity.

9. The device according to claim 7, wherein the piston includes a base on the side opposite to the cavity of the body and a disk in the cavity that is configured to contact with the protection cap of the glove.

10. The device according to claim 7, wherein the return means includes a spring positioned between the base and the body of the support.

11. A system to change a glove, comprising:
   a device to change a glove for manipulation in confined spaces, the device configured to replace a used glove with a new glove, each glove including:
   a part to receive a hand in a flexible material,
   a glove ring having a longitudinal axis, said glove ring surrounding an opening of the glove for insertion of the hand,
   said glove ring including means for attachment to a fixing element fixed to a containment enclosure,
   said fixing element including an element ring having a diameter that is substantially equal to an outside diameter of a first sleeve and including locking means to mate with locking means of the glove,
   said attachment means being designed to be locked and unlocked by application of a substantially axial force parallel to the longitudinal axis, and
   said attachment means being attached to said element ring, the device comprising:
   a support that has a cavity to receive the new glove,
   a push device that has a cavity to receive the used glove, and
   means to transfer the new glove from the support to the containment enclosure taking the place of the used glove, and to transfer the used glove from the enclosure to the push device,
   the support including a body and a piston that is mobile axially in an axial bore in the body, said piston being configured to transfer a protection cap to the new glove from the used glove, from the glove ring of new glove to the glove ring of used glove before the glove change, with said piston being maintained in a rest position by a return means to allow positioning of the new glove in the cavity of the support, and at least one protection cap.

12. A method to change a glove using a device to change a glove for manipulation in confined spaces, the device being configured to replace a used glove with a new glove, the glove including:
   a part to receive a hand in a flexible material,
   a glove ring having a longitudinal axis, said glove ring surrounding an opening of the glove for insertion of the hand,
   said glove ring including means for attachment to a fixing element fixed to a containment enclosure,
   said fixing element including an element ring having a diameter that is substantially equal to an outside diameter of a first sleeve of the glove ring and including locking means to mate with locking means of the glove,
   said attachment means being designed to be locked and unlocked by application of a substantially axial force parallel to the longitudinal axis, and
   said attachment means being attached to said element ring, the device comprising:
   a support that has a cavity to receive the new glove,
   a push device that has a cavity to receive the used glove, and
   means to transfer the new glove from the support to the containment enclosure taking the place of the used glove, and to transfer the used glove from the containment enclosure to the push device, the method comprising the following steps:

a) positioning the new glove in the cavity of the support,
b) positioning the push device bearing onto the element ring of the containment enclosure to which the used glove is attached,
c) positioning the glove ring of the used glove inside the glove ring of the new glove,
d) transferring the used glove from the element ring of the containment enclosure to the cavity of the push device and simultaneously transferring the glove ring of the new glove from the cavity of the support to the element ring of the containment enclosure, by applying a force from the push device to the support.

13. The method according to claim 12, including a step prior to step a) of positioning, in the containment enclosure, at least one new glove and the support.

14. The method according to claim 12, including a step prior to step b) of turning the used glove.

15. The method according to claim 12, including a step following step d) of removing the push device, loaded with the used glove, and of removing the ring of the new glove from the support.

16. The method according to claim 12, wherein
the support includes a body and a piston that is mobile axially in an axial bore in the body, and
said piston is configured to transfer a protection cap to the new glove from the used glove, from the glove ring of new glove to the glove ring of used glove before the glove change, with said piston being maintained in a rest position by a return means to allow positioning of the new glove in the cavity of the support,
said method comprising a step prior to step a) of positioning the protection cap in the glove ring of the new glove.

17. The method according to claim 16, including a step prior to step d) of transferring the protection cap of the glove ring of the new glove to the glove ring of the used glove, by the application of a push force of first intensity to the push device in a direction of the support.

18. The method according to claim 17, wherein during step d), the transfer is effected by the application of a force of a second intensity, that is greater than the first intensity, to the push device, in the direction of the support to transfer the glove ring of the new glove from the support to the element ring of the fixing element and to transfer the glove ring of the used glove from the element ring of the fixing element to the push device.

* * * * *